(12) United States Patent
Shi (10) Patent No.: US 8,026,999 B2
(45) Date of Patent: Sep. 27, 2011

(54) SUBSTRATE OF A LIQUID CRYSTAL DISPLAY PANEL, LIQUID CRYSTAL PANEL AND MANUFACTURING METHOD THEREOF

(75) Inventor: Yue Shi, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 286 days.

(21) Appl. No.: 12/124,500

(22) Filed: May 21, 2008

(65) Prior Publication Data

US 2009/0128753 A1    May 21, 2009

(30) Foreign Application Priority Data

Nov. 15, 2007  (CN) .......................... 2007 1 0177422

(51) Int. Cl.
*G02F 1/1335* (2006.01)
(52) U.S. Cl. ........................................................ 349/106
(58) Field of Classification Search .................. None
See application file for complete search history.

(56) References Cited

U.S. PATENT DOCUMENTS

| 6,532,050 | B1 | 3/2003 | Kim et al. |
| 6,717,637 | B1* | 4/2004 | Yoon et al. .................... 349/106 |
| 2003/0020851 | A1 | 1/2003 | Kim et al. |
| 2003/0098442 | A1* | 5/2003 | Ichihashi et al. ......... 252/299.01 |
| 2006/0232728 | A1* | 10/2006 | Kim .............................. 349/106 |
| 2007/0019141 | A1* | 1/2007 | Kizu et al. ..................... 349/123 |
| 2007/0252927 | A1* | 11/2007 | Ichihashi et al. ............. 349/106 |
| 2007/0252928 | A1* | 11/2007 | Ito et al. ........................ 349/106 |
| 2007/0263141 | A1* | 11/2007 | Yang ............................. 349/106 |

FOREIGN PATENT DOCUMENTS

| CN | 1290922 A | 4/2001 |
| CN | 1912723 A | 2/2007 |

* cited by examiner

*Primary Examiner* — Tina Wong
(74) *Attorney, Agent, or Firm* — Ladas & Parry LLP (57) ABSTRACT

Embodiments of the present invention provide a substrate of a liquid crystal display (LCD) panel, a liquid crystal panel, and a manufacturing method thereof. The substrate of a LCD panel comprises a first substrate, a color filter layer comprising color resins and a black matrix and formed on one surface of the first substrate, a transparent layer formed on the color filter layer and having a planar surface, and an array structure layer formed on the planar surface of the transparent layer or on the other surface of the first substrate.

15 Claims, 6 Drawing Sheets

A Englarge

SUBSTRATE OF A LIQUID CRYSTAL DISPLAY PANEL, LIQUID CRYSTAL PANEL AND MANUFACTURING METHOD THEREOF

BACKGROUND

The present invention relates to a thin film transistor liquid crystal display and a manufacturing method thereof.

Thin film transistor liquid crystal displays (TFT-LCDs) have the advantages of small volume, low power consumption, no radiation and so on and is becoming dominant in the current planar panel display market.

A traditional TFT-LCD comprises an array substrate, a color filter substrate, and liquid crystal material filled between the two substrates. The displaying mechanism of a TFT-LCD is that the electric field formed between the color filter substrate and the array substrate renders the liquid crystal molecules orientated, and the twisting angle of the liquid crystal molecules can be controlled by the electric field, intensity of which is adjusted by varying the applied voltage, so that the amount of light transmitted through pixels can be controlled and the desired image can be obtained. The array substrate comprises gate lines, data lines, pixel electrodes, and thin film transistors formed on a base substrate such as a glass substrate. The color filter substrate comprises a black matrix, red, green and blue (RGB) color resins, and a layer of indium tin oxide (ITO). The RGB color resins are used to achieve the color display of the liquid crystal display, the ITO layer is used for providing a common electrode for the color filter substrate, and the black matrix is used to shield the pixel peripheral area and the irregularly aligned liquid crystal molecules in a TFT forming area.

The traditional manufacturing process of a TFT-LCD mainly comprises a color filter process, an array process, and an assembling process. In the color filter process, the color filter substrate is prepared by repeating several times of film deposition, photolithograph, etching and the like on a glass substrate. Similarly, in the array substrate, the array substrate is prepared by repeating several times of film deposition, photolithograph, etching and the like on another glass substrate. In the assembling process, the prepared color filter substrate and array substrate are combined to form a liquid crystal display panel of a certain size by a serial of processes of alignment film applying, rubbing, liquid crystal filling, bonding, cutting, and the like.

In the traditional manufacturing process of a TFT-LCD, since the bonding deflection within a certain range arises in the assembling process of the color filter substrate and the array substrate, the product quality is disadvantageously affected to some extent. Where the deflection goes beyond the well-established standard, not only the black matrix cannot function properly to shield light, but also the displacement of the RGB color resins occurs, resulting in bad image quality. Even if the bonding deflection falls into an allowable range, the displacement of the color filter and the array substrate occurs upon a flapping test, which gives rise to white area in a normal image and results in image displaying defect. According to the traditional process, the bonding deflection can only be controlled within about 7.0 μm. Therefore, in order to prevent the poor light shield of the black matrix due to the bonding deflection, the traditional process normally appropriately enlarges the shielding area of the black matrix; however, the aperture ratio of a pixel unit is degraded.

SUMMARY

An embodiment of the invention provides a substrate of a liquid crystal display panel, comprising a first substrate, a color filter layer comprising color resins and a black matrix and formed on one surface of the first substrate, a transparent layer formed on the color filter layer and having a planar surface, and an array structure layer formed on the planar surface of the transparent layer or on the other surface of the first substrate.

Another embodiment of the invention provides a liquid crystal display panel, comprising a color/array substrate, a common substrate assembled with the color filter/array substrate, and a liquid crystal layer filled between the color filter/array substrate and the common substrate. The color filter/array substrate comprises a first substrate; a color filter layer comprising color resins and a black matrix and formed on one surface of the first substrate; a transparent layer formed on the color filter layer and having a planar surface; and an array structure layer formed on the planar surface of the transparent layer or on the other surface of the first substrate.

The embodiment of the invention provides a method of manufacturing a substrate of a liquid crystal display (LCD) panel, comprising forming a color filter layer on one surface of a first substrate; forming a transparent layer with a planar surface on the color filter layer; and forming an array structure layer on the other surface of the first substrate or on the planar surface of the transparent layer.

The embodiment of the invention also provides a method of manufacturing a liquid crystal display (LCD) panel, comprising preparing a color filter/array substrate and a common substrate, respectively; and the color filter/array substrate and the common substrate are assembled. Preparing the color filter/array substrate comprises forming a color filter layer on one surface of a first substrate; forming a transparent layer with a planar surface on the color filter layer; and forming an array structure layer on the other surface of the first substrate or on the planar surface of the transparent layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereinafter with reference to the accompanying drawings. It should be understood that in this description when a layer or a element is referred to as being "on" or "connected to" another layer or element, this layer or element can be directly on or directly connected to the other layer or element, or an intervening layer may also be present.

Figure 1:
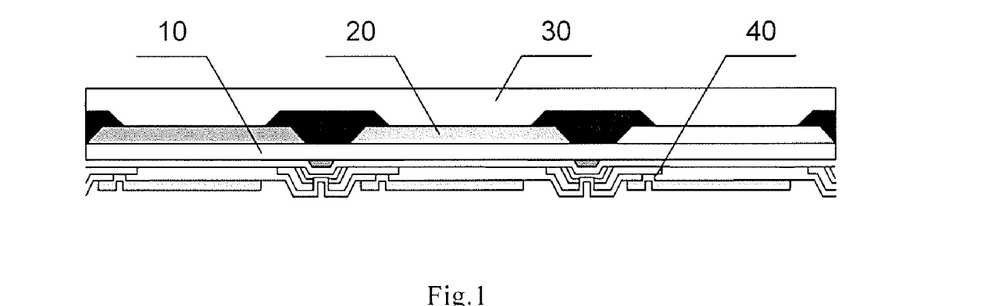
FIG. 1 is a schematic structure view of a substrate of a liquid crystal display panel according to a first embodiment of the invention.

FIG. 1 is a schematic structure view of a substrate of a LCD panel according to a first embodiment of the invention, and the substrate may be referred to as a color filter/array substrate of a TFT-LCD. This color filter/array substrate for example is used for a twisted nematic (TN) LCD. As shown in FIG. 1, the substrate of the LCD panel of the present embodiment comprises a first substrate 10, a color filter layer 20, a transparent layer 30, and an array structure layer 40. The color filter layer 20 is formed on a surface of the first substrate 10 and comprises a black matrix and a red color resin, a green color resin, and a blue color resin (referred to FIG. 5). The transparent layer 30 is formed on the color filter layer 20 and has a planar surface. The array structure layer 40 is formed on the other surface of the first substrate 10.

The present embodiment of the invention will be described below with reference to an exemplary manufacturing process of a substrate of a LCD panel.

Figure 2:
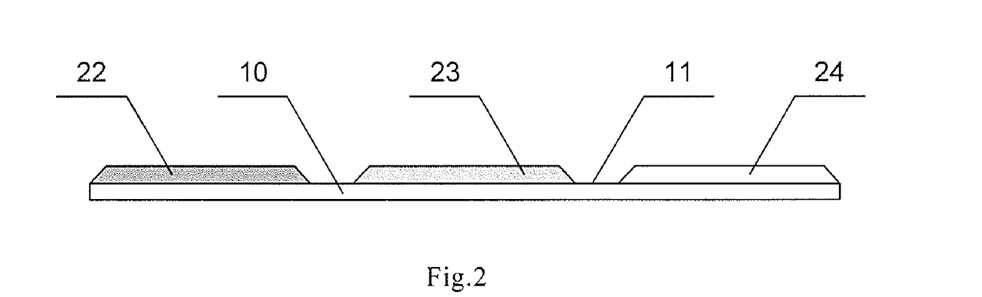
FIG. 2 is a schematic view of forming color resins according to the first embodiment of the invention.

FIG. 2 is a schematic view of forming the color resins according to the first embodiment of the invention. As shown in FIG. 2, a red color resin 22, a green color resin 23, and a blue color resin 24 are sequentially formed on the surface 11 of the first substrate 10 (e.g., a glass or plastic substrate) by processes of film formation, photolithograph, etching, lifting-off, and the like. All the above processes can employ the current traditional process and particularly are substantially the same as those used for manufacturing a traditional color filter substrate. The forming sequence of the red color resin 22, the green color resin 23 and the blue color resin 24 can be appropriately determined as necessary.

By taking the formation of the red color resin as an example, the specific process may comprise the following steps. First, a layer of red color resin film is deposited or coated on the surface of the first substrate; a photoresist layer is applied on the red color resin film; the photoresist layer is exposed for example with ultraviolet light by using a mask for the red color resin; with development, the exposed photoresist is removed and thus the red color resin pattern is formed by etching; finally, the remaining photoresist is removed for example by a lifting-off process and the forming process for the red color resin is completed.

Figure 3:
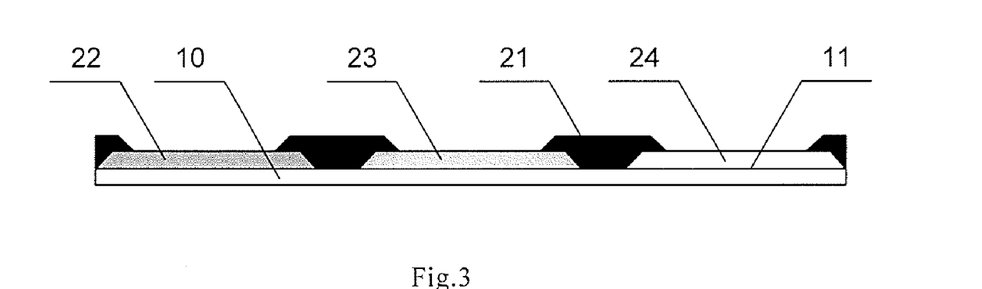
FIG. 3 is a schematic view of forming a black matrix according to the first embodiment of the invention.

FIG. 3 is a schematic view of forming a black matrix according to the first embodiment of the invention. As shown in FIG. 3, a black matrix 21 is formed on the surface 11 of the first substrate 10 by the processes of deposition, photolithograph, etching, lifting-off, and the like. The black matrix 21 is located among the red color resin 22, the green color resin 23, and the blue color resin 24 so as to shield the pixel peripheral area and irregularly alignment liquid crystal molecules in a TFT forming area. While the color filter layer 20 is formed, a plurality of alignment marks are formed as the alignment reference when subsequently forming an array structural layer, so that the color filter layer and the array structural layer can be accurately aligned with an alignment deflection of less than about 1.5 μm. The forming process of the alignment mark can be substantially the same as that in the traditional processes.

Figure 4:
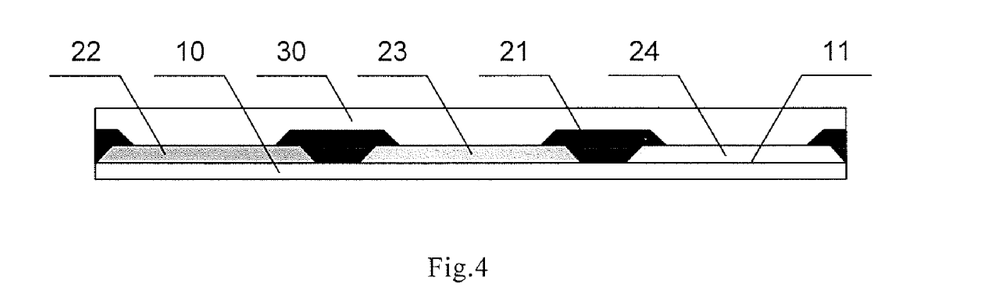
FIG. 4 is a schematic view of forming a transparent layer according to the first embodiment of the invention.

FIG. 4 is a schematic view of forming a transparent layer according to the first embodiment of the invention. As shown in FIG. 4, a transparent layer 30 is applied on the surface 11 of the first substrate 10 with the structure shown in FIG. 3. The material of the transparent layer 30 may have the characteristic of solidifying stability and the like and may be, for example, a glass or resin material. In the embodiment, the thickness of the transparent layer 30 is preferably larger than that of the color filter layer, and the thickness can render the surface planar. The process for forming the transparent layer 30 may comprises the following. After the color filter is formed, a material with transparent characteristic (e.g., a glass or resin material) is applied on the color filter uniformly to have a certain thickness for example by a coating process; then the transparent layer is solidified and flatted into a planar surface by solidifying and polishing so as to complete the preparation of the transparent layer.

Figure 5:
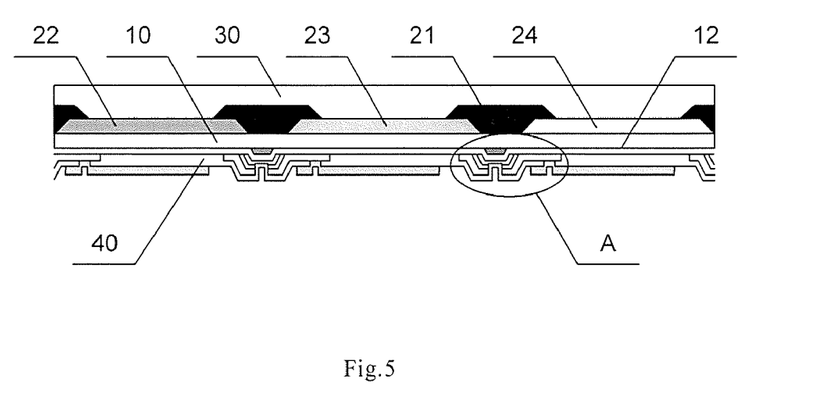
FIG. 5 is a schematic view of an array structure layer according to the first embodiment of the invention.

FIG. 5 is a schematic view of an array structure layer according to the first embodiment of the invention. As shown in FIG. 5, an array structure layer 40 of the embodiment is formed on the other surface 12 of the first substrate 10 (the lower surface in the drawing). A gate electrode, a gate line, a gate insulating layer, an active layer, a source-drain electrode layer, and a data line are formed on the surface 12 of the first substrate 10 by the processes of film deposition, photolithograph, etching, and the like for the layers. The above processes for forming the array structure can employ the methods and materials for a traditional array substrate.

Figure 6:
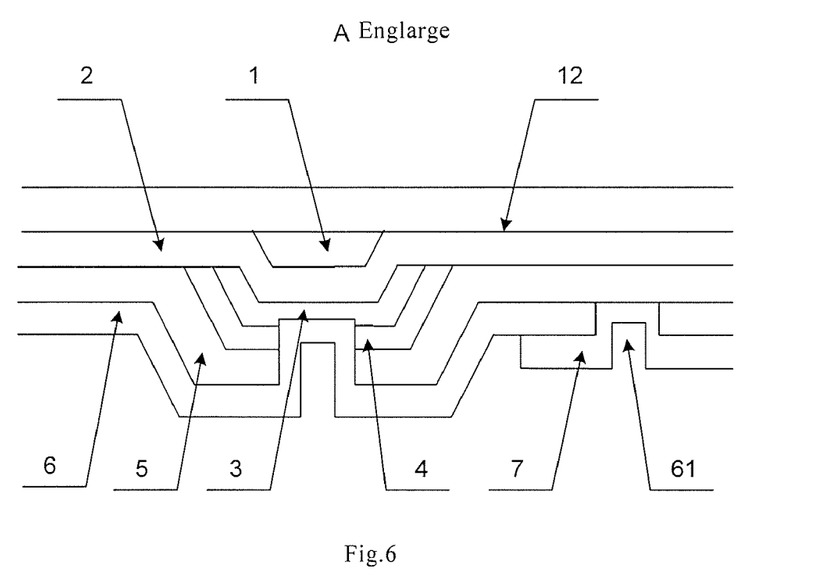
FIG. 6 is an enlarged view of the portion "A" in FIG. 5.

FIG. 6 is an enlarged view of the portion "A" in FIG. 5. By taking the array structure of twist nematic (TN) mode as an example, the specific process of forming the array structure layer is as follows. A layer of metal thin film is prepared on the surface 12 by magnetron sputtering, for example. The metal thin film may use molybdenum, aluminum, aluminum nickel alloy, molybdenum tungsten alloy, chromium, or copper, and may also use any combination of the metal materials. A gate electrode 1 and a gate line are formed in a certain area on the surface 12 by photolithograph process and etching process with a mask for the gate electrode and gate line. A gate insulating layer 2 (or a gate electrode insulating layer), a semiconductor thin film, and a doped semiconductor thin film are sequentially deposited on the surface 12 with the gate line and the gate electrode 1 for example by chemical vapor deposition (CVD). The material for the gate insulating layer 2 may be silicon nitride, or may use silicon oxide or silicon oxynitride. After the photolithograph with an active layer mask, the semiconductor thin film and the doped semiconductor film are etched, and thus a semiconductor layer 3 and a doped semiconductor layer 4 are formed above the gate electrode 1. By employing the manufacturing method similar to that of the gate electrode, another layer of metal thin film is deposited on the surface 12, for example. The metal thin film may use molybdenum, aluminum, aluminum nickel alloy, molybdenum tungsten alloy, chromium, or copper, and may also use any combination of the metal materials. The data line and the source/drain electrodes 5 are formed with mask for the source/drain electrodes and the data line, and the exposed doped semiconductor layer 4 is removed by etching process so as to expose the semiconductor layer 3 thereunder. By the manufacturing method similar to those of the gate insulating layer and the active layer, a passive layer 6 is deposited on the surface 12, the material of which may be silicon nitride. A passive layer through hole 61 is formed at the location of the drain electrode by photolithograph process and etching process with a passive layer mask. Finally, on the surface 12 of the above-formed structure, a pixel electrode 7 is formed by the processes of deposition, photolithograph and etching process, and the pixel electrode 7 is connected with the drain electrode via the passive layer through hole 61.

Figure 7:
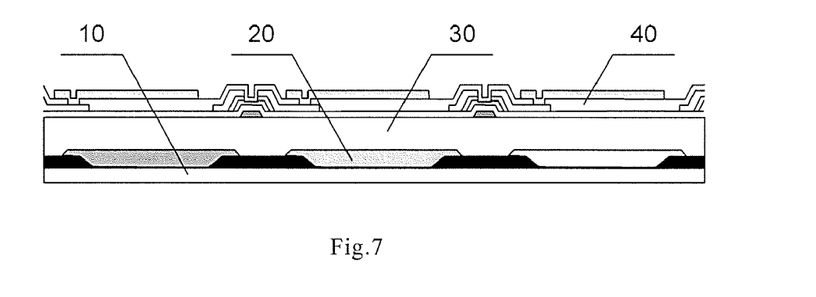
FIG. 7 is a schematic structure view of a substrate of a liquid crystal display panel according to a second embodiment of the invention.

FIG. 7 is a schematic structure view of a substrate of a LCD panel according to a second embodiment of the invention. This substrate according to the second embodiment for example is used for a twisted nematic (TN) LCD, also. As shown in FIG. 7, the substrate of a LCD panel of the embodiment comprises a first substrate 10, a color filter layer 20, a transparent layer 30, and an array structure layer 40. The color filter layer 20 is formed on one surface of the first substrate 10 and comprises a black matrix and a red color resin, a green color resin and a blue color resin. The transparent layer 30 is formed on the color filter layer 20 and has a planar surface. The array structure layer 40 is formed on the transparent layer 30.

The structure of this embodiment is substantially the same as that of the first embodiment, and the difference lies in that the array structure layer 40 is formed on the transparent layer 30. The structure of this embodiment of the invention is further described with reference to the manufacturing processes of a substrate of a LCD panel according to the embodiment.

Figure 8:
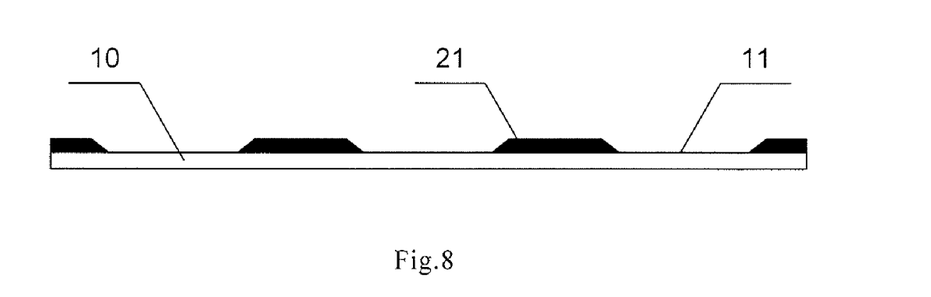
FIG. 8 is a schematic view of forming a black matrix according to the second embodiment of the invention.
Figure 9:
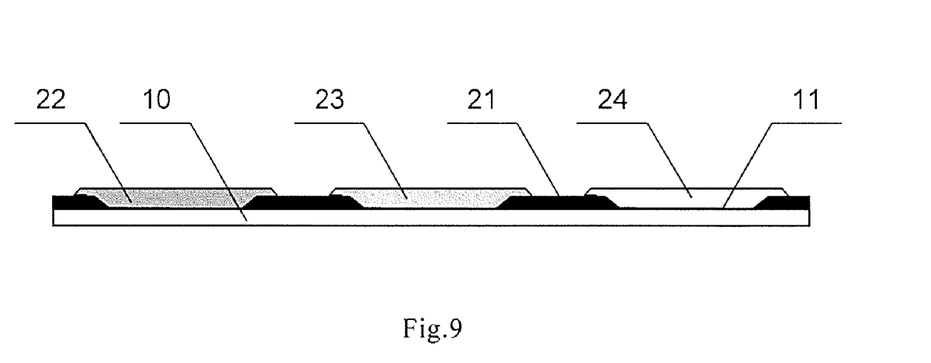
FIG. 9 is a schematic view of forming color resins according to the second embodiment of the invention.

FIG. 8 is a schematic view of forming a black matrix according to the second embodiment of the invention. As shown in FIG. 8, a black matrix 21 is formed on a surface 11 of the first substrate 10 by the processes of deposition, photolithograph, etching, lifting-off, and the like. The black matrix 21 is disposed separately to shield the pixel peripheral area and the irregularly aligned liquid crystal molecules in a TFT forming area. FIG. 9 is a schematic view of forming color resins according to the second embodiment of the invention. As shown in FIG. 9, a red color resin 22, a green color resin 23, and a blue color resin 24 are formed on the surface 11 of the first substrate 10 by the processes of deposition, photolithograph, etching, lifting-off and the like. Each color resin is formed to be enclosed by the black matrix 21. All the above processes may employ the traditional methods and material such as those mentioned in the first embodiment. While the color filter layer 20 is formed, a plurality of alignment marks are formed as the alignment reference in the subsequent array structural layer process, so that the color filter layer and the array structural layer can be accurately aligned with an alignment deflection of less than about 1.5 µm.

Figure 10:
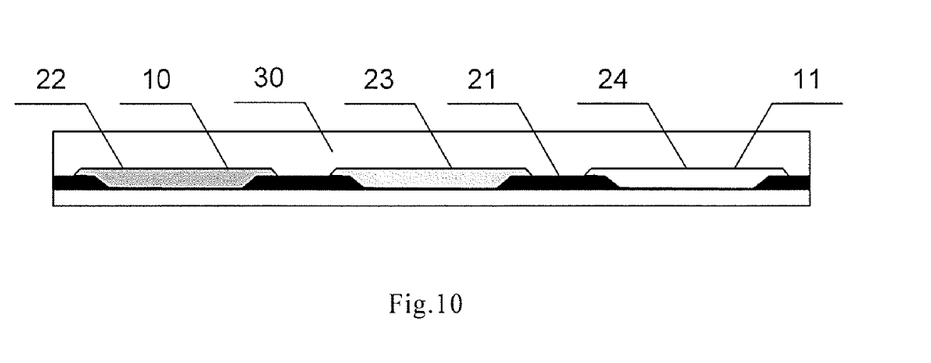
FIG. 10 is a schematic view of forming a transparent layer according to the second embodiment of the invention.

FIG. 10 is a schematic view of forming a transparent layer according to the second embodiment of the invention. As shown in FIG. 10, a transparent layer 30 is applied on the surface 11 of the first substrate 10 with the structure as shown in FIG. 9. The material of the transparent layer 30 may have the characteristic of solidifying stability and the like and may be, for example, a glass or resin material. In the embodiment, the thickness of the transparent layer 30 is preferably larger than that of the color filter layer, and the thickness is can render the surface planar. The process for forming the transparent layer 30 may be as the follows. After the color filter is formed, the material with transparent characteristic (e.g., a glass or resin material) is applied on the color filter uniformly to have a certain thickness for example by the application process; then the transparent material is solidified and flatted into a planar surface by the process of solidifying and polishing so as to complete the preparation of the transparent layer.

Figure 11:
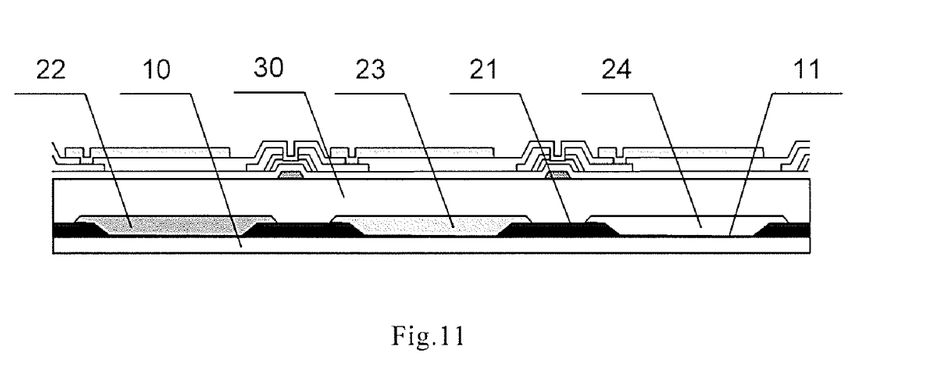
FIG. 11 is a schematic view of an array structure layer according to the second embodiment of the invention.

FIG. 11 is a schematic view of an array structure layer according to the second embodiment of the invention. As shown in FIG. 11, the transparent layer 30 of the embodiment is formed on the transparent layer 30. A gate electrode, a gate line, a gate insulating layer, an active layer, a source-drain electrode layer, and a data line are formed on the transparent layer 30 by the processes of film deposition, etching and the like for the various layers. The above processes may employ the methods and materials for a traditional array substrate.

A substrate of a LCD panel integrating a color filter layer and an array structure is provided in the above two embodiments of the invention. With the transparent layer, the color filter layer is formed within a substrate for a LCD panel (CF-in-glass substrate), the array structure is formed on any side of the substrate with the color filter layer, and the integrated color filter/array substrate is provided finally. Since the color filter layer is formed within the substrate according to the embodiments of the invention, the array structure is formed on any side of the substrate, which brings about large flexibility and operability for forming the substrate. Since the color filter layer and the array structure layer are formed on the same glass substrate, the alignment accuracy in the processes for forming the array structure layer can be controlled for example within about 1.5 µm. Compared with the alignment accuracy of about 7.0 µm in the traditional assembling process, the black matrix and the array structure in the color filter/array substrate according to the embodiments of the invention can realize excellent alignment, and the subsequent assembling process accuracy does not substantially influence the location of the black matrix. Also, in designing of the black matrix, since the alignment deflection of the color filter and the array substrate generated by the bonding is not needed to consider, the shielding scope of the black matrix can be properly reduced, and the aperture ratio of a pixel unit can be increased, so that the characteristic of brightness of the produced TFT-LCD can be increased dramatically. Upon performing flapping test, since the color filter layer and the array structure layer are placed together, the light leakage phenomenon due to the displacement of the color filter and the array can be avoided, improving the image display quality of the TFT-LCD.

Figure 12:
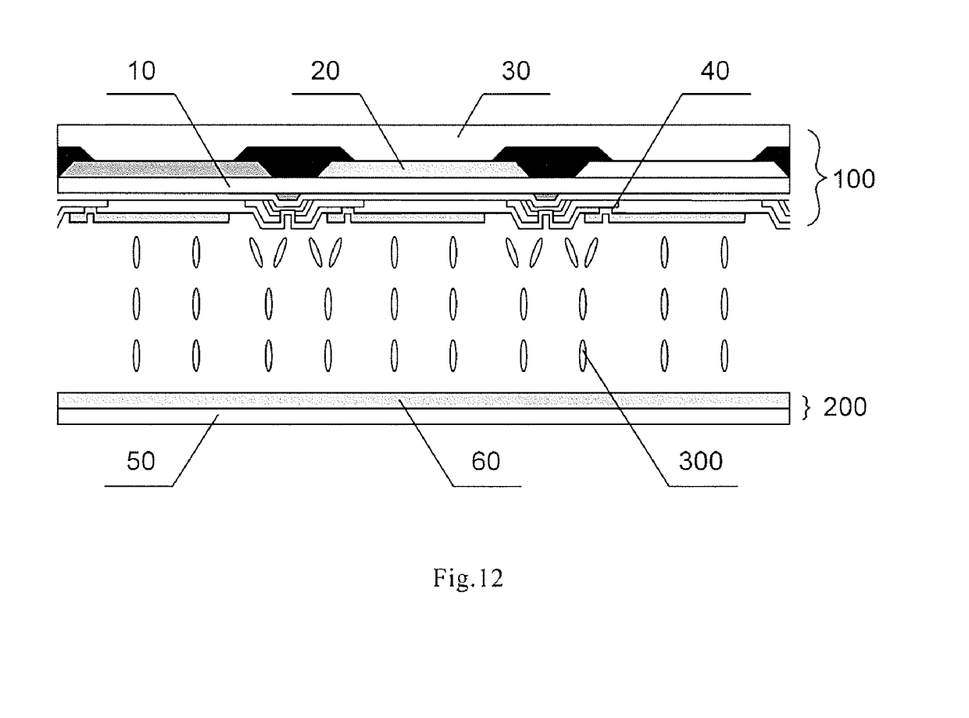
FIG. 12 is a schematic structure view of the LCD panel according to a third embodiment of the invention.

FIG. 12 is a schematic structure view of a LCD panel according to a third embodiment according to the invention. As shown in FIG. 12, the LCD panel according to the embodiment comprises a color filter/array substrate 100 and a common substrate 200, and a liquid crystal layer 300 disposed between the color filter/array substrate 100 and the common substrate 200 that are bonded together.

The color filter/array substrate 100 employs the substrate structure of the LCD panel according to the first embodiment of the invention as shown in FIG. 1 and comprises a substrate 10, a color filter layer 20, and a transparent layer 30, and an array structure layer 40. The color filter layer 20 is formed on one surface of the first substrate and comprises a black matrix and a red color resin, a green color resin, and a blue color resin. The transparent layer 30 is formed on the color filter layer 20 and has a planar surface. The array structure layer 40 is formed on the other surface of the first substrate 10. The common substrate 200 comprises at least a second substrate 50.

The color filter/array substrate 100 and the common substrate 200 are finally formed into the LCD panel according to the embodiment by the processes of alignment film applying, rubbing orientation, liquid crystal filling, bonding, cutting and the like. The color filter/array substrate 100 is used as the upper substrate of the LCD panel, the common substrate 200 is used as the lower substrate of the LCD panel, and the column spacer provided between the substrates may be selectively formed on the upper substrate or on the lower substrate.

Figure 13:
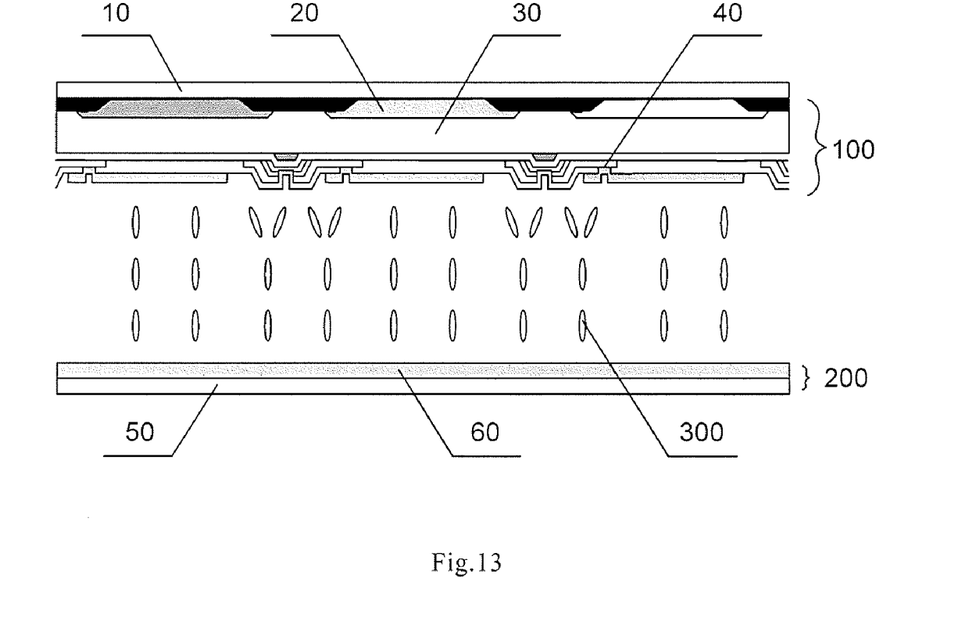
FIG. 13 is a schematic structure view of the LCD panel according to a fourth embodiment of the invention.

FIG. 13 is a schematic structure view of the LCD panel according to a fourth embodiment of the invention. As shown in FIG. 13, the LCD panel according to the embodiment comprises a color filter/array substrate 100 and a common substrate 200, and the liquid crystal layer 300 filled between the color filter/array substrate 100 and the common substrate 200 bonded together.

The color filter/array substrate 100 employ the substrate structure of the LCD panel according to the second embodiment of the invention as shown in FIG. 7 and comprises a substrate 10, a color filter layer 20, and a transparent layer 30 and an array structure layer 40. The color filter layer 20 is formed on one surface of the first substrate and comprises a black matrix and a red color resin, a green color resin and a blue color resin. The transparent layer 30 is formed on the color filter layer 20 and has a planar surface. The array structure layer 40 is formed on the transparent layer 30. The common substrate 200 comprises at least a second substrate 50.

The color filter/array substrate 100 and the common substrate 200 are finally formed into the LCD panel according to the embodiment by the processes of alignment film applying, rubbing, liquid crystal filling, bonding, cutting and the like. The color filter/array substrate 100 is used as the upper substrate of the LCD panel, the common substrate 200 is used as the lower substrate of the LCD panel, and the column spacer may be selectively formed on the upper substrate and the lower substrate.

As shown in FIGS. 12 and 13, the common substrate 200 comprises an ITO layer 60 formed on the second substrate 50, and the ITO layer 60 is used as a common electrode layer for cooperating with the pixel electrode in the array structure layer to control the orientation of liquid crystal molecules. In practice, for some type of LCD panel (such as a TN type), the ITO layer is disposed on the common substrate 200, and the array structure layer on the color filter/array substrate 100 has the configuration as shown in FIG. 5, and the common electrode may be disposed on the color filter/array substrate 100 for some other types of LCD panels such as a fringe field switching (FFS) type or in-plane switching (IPS) type. In an FFS type panel, a common electrode layer is formed first, an insulation layer is formed on the common electrode layer, and then the components such as a thin film transistor, a gate line, a date line, a pixel electrode and the like are formed on the insulation layer, in which the pixel electrode is formed in a comb pattern. In an IPS type panel, a pixel electrode and a common electrode are formed on the same level and are formed in a comb pattern, respectively, and branches of the pixel electrode and the common electrode are alternately formed. Thus, with respect to an FFS or IPS type panel, the array structure layer also comprises a common electrode structure formed therein in addition to components such as a thin film transistor, a gate line, a date line, a pixel electrode. The configuration of the array structure layer of an FFS or IPS type panel is well known in the art, thus the detailed description is not repeated herein.

It can be seen from the embodiments as shown in FIGS. 12 and 13 that the color filter layer and the array structure layer are formed on the same substrate. Since the color filter layer is formed within the substrate for a LCD panel according to the embodiments of the invention, the array structure layer may be formed at either side of the substrate with large flexibility and operability. Since the alignment mark required in forming the array structure has already been formed in the color filter process, each processes for the array structure layer can be aligned accurately, and the alignment deflection can be controlled within about 1.5 μm. Therefore, compared with the deflection of about 7.0 μm in the traditional assembling process, the black matrix and the array structure can be aligned well in the color filter/array substrate according to the embodiments of the invention, and the accuracy of the subsequent assembling process do not affect the location of the black matrix. In designing the black matrix, since the alignment deflection of the color filter and the array structure due to the assembling process can be avoided, the shielding scope of the black matrix may be properly reduced, the aperture ratio of a pixel unit can be increased and the characteristic of the brightness and the like of a TFT-LCD can be improved dramatically. In a flapping test, the color filter layer and the array structure layer are placed together, and therefore the light leakage due to the displacement of the color filter and the array does not occur, improving image display quality of the produced TFT-LCD. Furthermore, the color filter/array substrate is used as the upper substrate of the LCD panel according to the embodiment of the invention, so that the pressure-resist of the LCD panel can be increased, and mura phenomena and the like can be alleviated.

Figure 14:
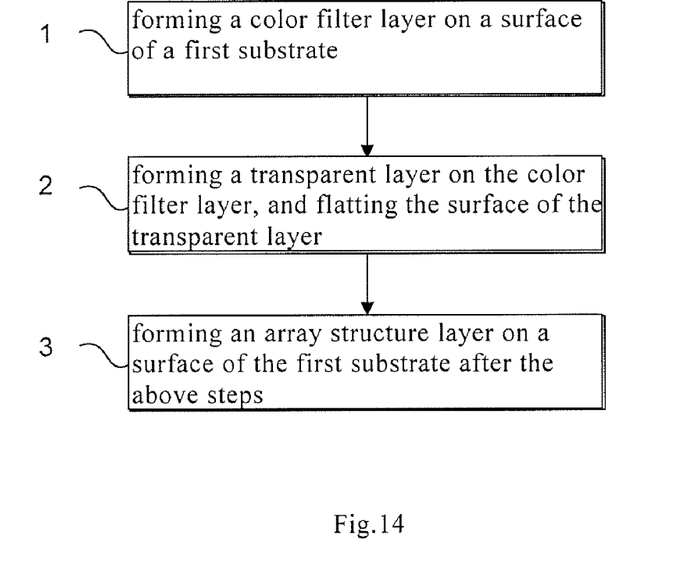
FIG. 14 is a flow chart of a manufacturing method of a substrate of a LCD panel according to an embodiment of the invention.

FIG. 14 is a flow chart of a manufacturing method of a substrate of a LCD panel according to an embodiment of the invention. The manufacturing method may comprises the following steps of:

step 1, forming a color filter layer on a surface of a first substrate;

step 2, forming a transparent layer on the color filter layer, and flatting the surface of the transparent layer; and step 3, forming an array structure layer on a surface of the first substrate after the above steps.

Therefore, the manufacturing method of the LCD panel according to the embodiment of the invention provides a method for manufacturing a substrate for a LCD panel, in which the color filter layer and the array structure layer are integrated. Next, the method will be described with reference to the accompanying drawings.

Figure 15:
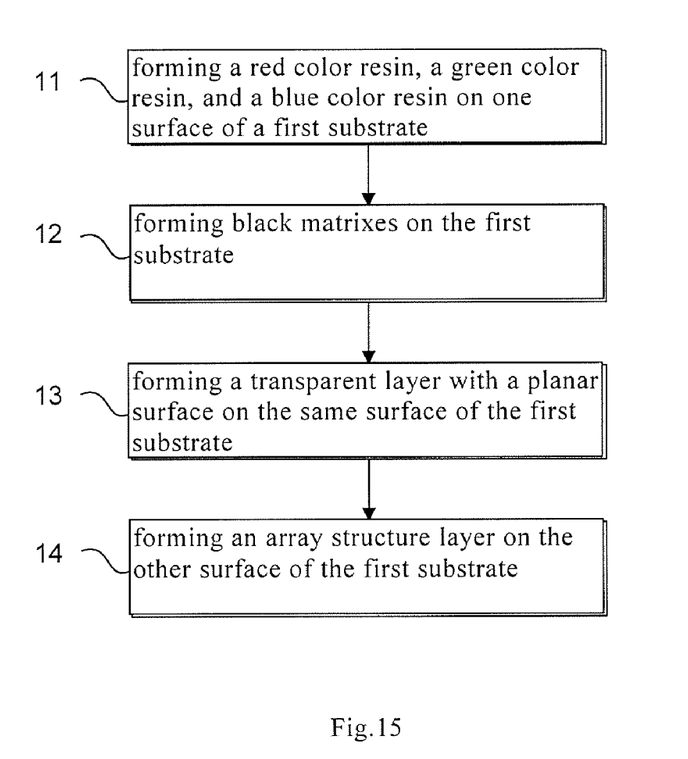
FIG. 15 is a flow chart of a manufacturing method of a substrate of a LCD panel according to a fifth embodiment of the invention.

FIG. 15 is a flow chart of a manufacturing method of a substrate of a LCD panel according to a fifth embodiment of the invention, and the manufacturing method may comprise:

step 11, forming a red color resin, a green color resin, and a blue color resin on one surface of a first substrate;

step 12, forming a black matrix on the first substrate after step 11;

step 13, forming a transparent layer with a planar surface on the same surface of the first substrate after step 12; and step 14, forming an array structure layer on the other surface of the first substrate after step 13.

In addition, step 11 and step 12 may further comprise the step of forming an alignment mark, and the alignment mark is used as the alignment reference for forming the array structure layer subsequently, so that the color filter layer and the array structure layer can be aligned accurately with an alignment deflection of less than about 1.5 μm.

In step 11, the red color resin, the green color resin, and the blue color resin are sequentially formed on the surface of the first substrate by the processes of deposition, photolithograph, etching, lifting-off, and the like. The methods and materials for all the above processes may employ the traditional ones as mentioned above.

In step 12, the black matrix is formed on the surface of the first substrate by the processes of deposition, photolithograph, etching, lifting-off, and the like, and the black matrix is located among the patterned red color resin, the patterned green color resin, and the patterned blue color resin so as to shield the pixel peripheral area and the irregularly aligned liquid crystal molecules in a TFT forming area.

In step 13, the transparent layer is applied on the same surface of the first substrate as the color filter layer, and the material of the transparent layer has the characteristics of solidifying stability, such as a glass or resin material. In the embodiment, the thickness of the transparent layer is preferably larger than that of the color filter layer so as to render the surface of the transparent layer planar.

In step 14, by repeating film deposition and patterning of each layer, the array structure layer is formed on the other surface of the first substrate. The array substrate comprises a gate electrode, a gate line, an active layer, a source-drain electrode layer, a data line, a passive layer, and a pixel electrode. The methods and materials for all the above processes may employ the traditional ones as mentioned above.

Figure 16:
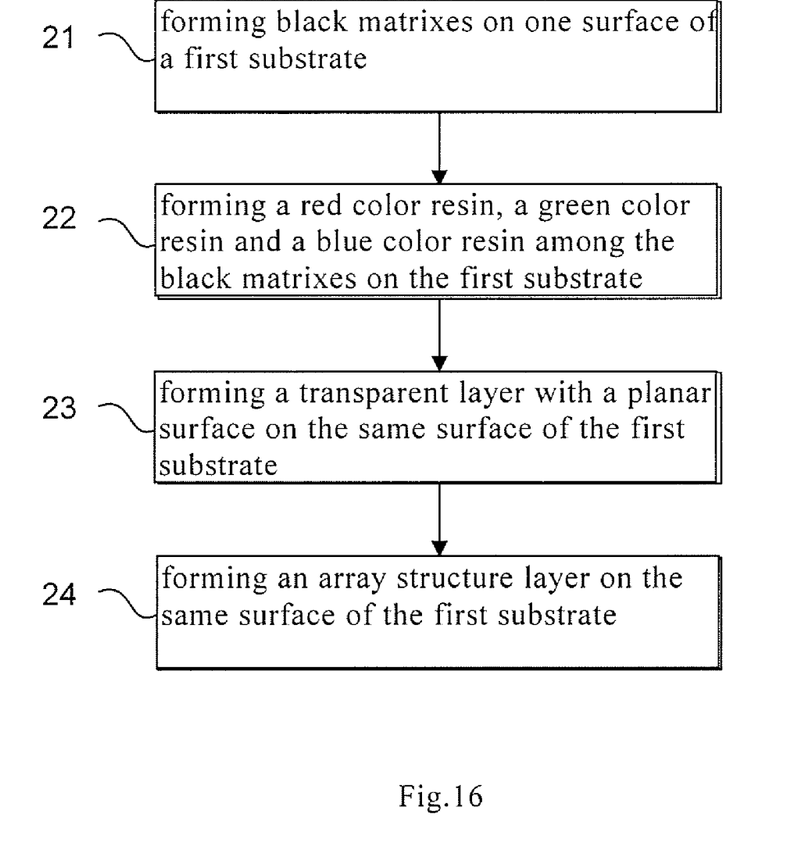
FIG. 16 is a flow chart of a manufacturing method of a substrate of a LCD panel according to a six embodiment of the invention.

FIG. 16 is a flow chart of a manufacturing method of a substrate of a LCD panel according to a six embodiment of the invention, and the manufacturing method may comprise:

step 21, forming a black matrix on one surface of a first substrate;

step 22, forming a red color resin, a green color resin and a blue color resin in the black matrix on the first substrate after step 21;

step 23, forming a transparent layer with a planar surface on the same surface of the first substrate after step 22; and step 24, forming an array structure layer on the same surface of the first substrate after step 23.

In addition, step 21 and step 22 may further comprise the step of forming the an alignment mark, and the alignment mark is used as the alignment reference for forming the array structure layer subsequently, so that the color filter layer and the array structure layer can be aligned accurately with an alignment deflection of less than about 1.5 μm.

In step 21, the black matrix is formed on the surface of the first substrate by the processes of deposition, photolithograph, etching, lifting-off, and the like, and the black matrix is used to shield the pixel peripheral area and the irregularly aligned liquid crystal molecules in a TFT forming area.

In step 22, the red color resin, the green color resin and the blue color resin are sequentially formed on the surface of the first substrate by the processes of deposition, photolithograph, etching, lifting-off and the like. The red color resin, the green color resin and the blue color resin are located in a black matrix. The methods and materials for all the above processes may employ the traditional ones as mentioned above.

In step 23, the transparent layer is applied on the same surface of the first substrate, and the material of the transparent layer has the characteristics of solidifying stability, such as a glass or resin material. In the embodiment, the thickness of the transparent layer is preferably larger than that of the color filter layer, and the thickness can render the surface of the transparent layer planar.

In step 24, by repeating the deposition and patterning of each of the layers, the array structure layer is formed on the same surface (i.e., on the transparent layer side) of the first substrate. The array substrate may comprise a gate electrode, a gate line, an active layer, a source-drain electrode layer, a data line, a passive layer, and a pixel electrode. The methods and materials for all the above processes may employ the traditional ones as mentioned above.

Figure 17:
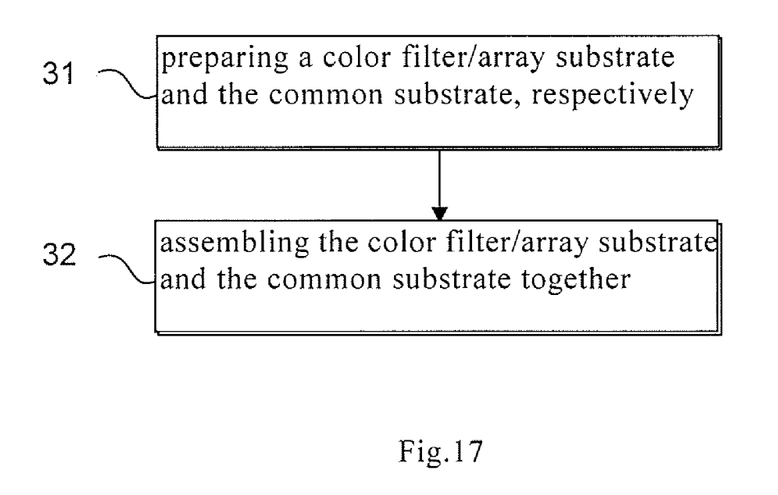
FIG. 17 is a flow chart of the manufacturing method of a LCD panel according to an embodiment of the invention.

FIG. 17 is a flow chart of the manufacturing method of a LCD panel according to an embodiment of the invention, and the manufacturing method may comprise:

step 31, preparing a color filter/array substrate according to the above mentioned embodiments and the common substrate respectively; and step 32, assembling the color filter/array substrate and the common substrate together.

As shown in FIG. 17, the color filter/array substrate is prepared by the manufacturing method of the substrate of the LCD panel according to the embodiment of the invention as shown in FIG. 14, and the common substrate can be prepared according to the used color filter/array substrate as mentioned above. The color filter/array substrate and the common substrate are formed into a LCD panel of a certain size by the processes of alignment film applying, rubbing, liquid crystal filling, bonding, cutting and the like. The color filter/array substrate is used as the upper substrate of the liquid crystal, the common substrate is used as the lower substrate of the LCD panel, and the column spacer may be selectively formed on the upper substrate or the lower substrate. Since the color filter/array substrate is used as the upper substrate of the LCD panel in the embodiment of the invention, the pressure-resist of the LCD panel is increased, and mura phenomena and the like are alleviated.

It should be appreciated that the embodiments described above are intended to illustrate but not limit the present invention. Although the embodiments of the present invention has been described in detail herein, it should be understood by those skilled in the art that the present invention can be realized with different material and equipment as necessary, and that various modification and equivalents thereof can be made herein without departing from the spirit and scope of the present invention.

What is claimed is:

1. A substrate adapted to be disposed opposite to a common substrate with an interposed liquid crystal layer to form a liquid crystal display (LCD) panel, comprising:
   a first substrate;
   a color fitter layer comprising color resins and a black matrix and formed on one surface of the first substrate;
   a transparent layer formed on the color filter layer and having a planar surface; and
   an array structure layer formed on the other surface of the first substrate.

2. The substrate claim 1, wherein the color filter layer comprises:
   a red color resin, a green color resin, and a blue color resin, which are formed on the surface of the first substrate; and
   the black matrix formed among the red color resin, the green color resin, and the blue color resin.

3. The substrate claim 1, wherein the color filter layer comprises:
   the black matrix formed on the surface of the first substrate; and a red color resin, a green color resin, and a blue color resin formed in the black matrix.

4. The substrate claim 1, wherein the material of the transparent layer is a transparent material with characteristics of solidifying stability.

5. The substrate claim 1, wherein an alignment mark as an alignment reference for forming the array structure layer is formed on the first substrate, so that the color filter layer and the array structure layer are accurately aligned with an alignment deflection of less than about 1.5 µm.

6. The substrate claim 1, further comprising a common electrode structure in the array structure layer.

7. A liquid crystal display (LCD) panel, comprising a color/array substrate, a common substrate assembled with the color filter/array substrate, and a liquid crystal layer filled between the color filter/array substrate and the common substrate, wherein
the color filter/array substrate comprises:
a first substrate;
a color filter layer comprising color resins and a black matrix and formed on one surface of the first substrate;
a transparent layer formed on the color filter layer and having a planar surface; and
an array structure layer formed on the other surface of the first substrate.

8. The LCD panel of claim 7, wherein the color filter/array substrate further comprises a common electrode structure in the array structure layer.

9. The LCD panel of claim 7, wherein the common substrate comprises a second substrate and a common electrode layer on a surface of the second substrate facing the color filter/array substrate.

10. A method of manufacturing a substrate adapted to be disposed opposite to a common substrate with an interposed liquid crystal layer to form a liquid crystal display (LCD) panel, comprising:
forming a color filter layer on one surface of a first substrate;
forming a transparent layer with a planar surface on the color filter layer; and
forming an array structure layer on the other surface of the first substrate.

11. The method of claim 10, wherein forming the color filter layer on the surface of the first substrate comprises:
forming a red color resin, a green color resin, and a blue color resin on the surface of the first substrate, respectively; and
forming a black matrix among the red color resin, the green color resin, and the blue color resin.

12. The method of claim 10, wherein forming the color filter layer on the surface of the first substrate further comprises:
forming an alignment mark on the first substrate as an alignment reference for forming the array structure layer.

13. A method of manufacturing a liquid crystal display (LCD) panel, comprising:
preparing a color filter/array substrate and a common substrate, respectively; and
assembling the color filter/array substrate and the common substrate together with an liquid crystal layer interposed between the substrates, wherein preparing the color filter/array substrate comprises:
forming a color filter layer on one surface of a first substrate;
forming a transparent layer with a planar surface on the color filter layer; and
forming an array structure layer on the other surface of the first substrate.

14. The method of claim 13, wherein assembling the color filter/array substrate and the common substrate comprises:
the color filter/array substrate and the common substrate are used as an upper substrate and a lower substrate, and the assembling is completed by processes comprising alignment film applying, rubbing, liquid crystal filling, bonding, and cutting.

15. The method of claim 14, wherein assembling the color filter/array substrate and the common substrate further comprises:
forming column spacers on the color filter/array substrate or the common substrate.

* * * * *